3,075,002
PROCESS FOR PREPARING α-FLUOROACRYLATES
John Andrew Sedlak, Stamford, Conn., assignor to American Cyanamid Company, New York, N.Y., a corporation of Maine
No Drawing. Filed Feb. 21, 1962, Ser. No. 174,701
9 Claims. (Cl. 260—486)

The present invention relates to the preparation of α-fluoroacrylates. More particularly, it relates to the preparation of esters of α-fluoroacrylic acid directly obtained from certain fluoroacetates.

Heretofore, esters of substituted α-haloacrylic acid have been prepared from benzaldehyde and either ethyl fluoroacetate or ethyl chloroacetate. The corresponding β-phenyl derivative of α-fluoro or α-chloroacrylic ester or acid is obtained. See, for instance, Journal Chemical Society (London), 1956, at page 1524, and Berichte, Volume 38 at page 693 (1905). It is also known that the reaction between formaldehyde as derived from trioxymethylene and ethyl chloroacetate in an ethereal sodium ethoxide yields a glycidic ester or heterocyclic product to the exclusion of the expected α-chloroacrylic ester. See Compte rend., 142, at page 214 (1906). To the present, therefore, α-fluoroacrylate esters have not been directly prepared from a formaldehyde reactant.

Unsubstituted α-fluoroacrylates find particular utility as monomers in polymerizing such esters to the corresponding polymeric form. However, substituted α-fluoroacrylates, such as for instance the β-phenyl derivatives as prepared in the Journal Chemical Society article hereinabove cited, cannot be employed for the purpose.

It has been unexpectedly found that esters of α-fluoroacrylic acid of the structure:

$$CH_2=CFCOOR$$

where R is an alkyl radical, such as methyl, ethyl, propyl, butyl or hexyl, can be obtained in a straight-forward and efficient manner. In general, the reaction is accomplished by admixing a formaldehyde reactant, either as a monomer or as a polymer, with a fluoroacetate in substantially equimolar proportions in the presence of a strong base.

Monomeric formaldehyde reactant herein employed is conveniently obtained from one of its polymers, paraformaldehyde, by heating the same and collecting resultant formaldehyde vapor. Alternatively, polymeric formaldehyde can be utilized directly either as paraformaldehyde or as s-trioxane.

Advantageously, the process of the present invention is carried out at temperatures between about minus (−) 10° C. and plus (+) 25° C., preferably at temperatures maintained at about 0° C. It is a good practice, moreover, to cool the fluoroacetate reactant to approximately 0° C. in the presence of a solvent containing a strong base, and admixing therewith formaldehyde in its gaseous form, or s-trioxane or paraformaldehyde into the reaction medium.

Illustrative strong bases are, for instance: sodium hydride, lithium hydride, potassium hydride, sodium hydroxide, potassium hydroxide, sodium ethoxide and sodium methoxide. It has been found that one mol of latter base per mol of the fluoroacetate reactant added is preferably employed, although smaller or larger quantities of base can be tolerated.

Illustrative solvents include, for instance: ether, benzene, petroleum ether, ethanol, methanol and the like.

A reaction time of from about one to five hours is found to be sufficient to effect completion of the reaction. At the end of such time, the reaction mass is neutralized in any suitable manner employing an acid, such as for instance, hydrochloric, sulfuric or acetic acid. So-neutralized product is then extracted with a suitable organic solvent, such as for instance ether or benzene. The extract is next distilled to separate the solvent to recover desired α-fluoroacrylate.

In order to facilitate a further understanding of the invention, the following examples are presented primarily for the purpose of illustrating certain more specific details thereof. The scope of the invention is not to be deemed limited thereby except as defined in the claims. Unless otherwise stated, the parts are by weight.

Example 1

50 parts of ethyl fluoroacetate are added slowly during a fifteen-minute period to a stirred mixture of 32 parts of sodium ethoxide in 99 parts of anhydrous absolute ethyl alcohol at room temperature in a suitable reaction vessel and a dry nitrogen atmosphere. Heat is evolved and the temperature of the mixture increases to about 50° C. It is stirred for an additional hour.

28.4 parts of paraformaldehyde are separately heated in a suitable reaction vessel. Evolved gaseous formaldehyde thus formed over a forty-five minute period, is slowly conducted into the ethyl fluoroacetate mixture while stirring that mixture in an ice-water bath maintained at approximately 0° C.

The reaction mixture is thereafter poured into a stirred mixture of 48 parts of concentrated sulfuric acid, 100 parts of water and 200 parts of cracked ice. After adding 71 parts of ether and warming the reaction mass to room temperature, the ether layer is separated from the aqueous layer and the former ether layer is washed with saturated aqueous sodium chloride, saturated aqueous sodium bicarbonate and saturated aqueous sodium chloride, respectively. Thereafter, a small quantity of hydroquinone is added to the washed ether solution and the latter is then dried over anhydrous magnesium sulfate. The dried solution is removed by filtration and the ether contained therein is recovered by distillation. On further distillation, ethyl α-fluoroacrylate is recovered in good yield and is identified by vapor phase chromatographic analysis.

Example 2

The procedure of Example 1 is followed in every detail, except that ethyl fluoroacetate s replaced by a molar equivalent of methyl fluoroacetate. The strong base, sodium ethoxide, is also replaced by a molar equivalent of sodium methoxide. It is noted that vapor phase chromatographic analysis indicates the presence of methyl α-fluoroacrylate in a good yield.

Example 3

Repeating the procedure of Example 1 in every detail, except that 14.2 parts of s-trioxane are substituted for the gaseous formaldehyde reactant, ethyl fluoroacrylate is identified by vapor phase chromatographic analysis in good yield.

Example 4

To a suitable vessel substantially free from humidity and containing 12.7 parts of sodium methoxide and 35 parts of anhydrous ether are added 21.7 parts of methyl fluoroacetate with agitation while cooling the reaction vessel in an ice-water bath. Resultant mixture is then stirred at 0° C. for thirty minutes and for an additional fifteen minutes at 25° C. It is again cooled to 0° C. and stirred.

Paraformaldehyde (7.1 parts) is next added to the cooled, stirred mixture. After stirring for one hour at 0° C., the mixture is neutralized with cold dilute sulfuric acid and extracted with ether. On distillation of the dried ether extract, methyl α-fluoroacrylate is recovered in good yield. The unsubstituted ester is identified by infrared and vapor phase chromatographic analysis.

*Example 5*

The procedure of Example 4 is repeated in every detail except that 25 parts of ethyl fluoroacetate and 16.1 parts of sodium ethoxide are employed in lieu of methyl fluoroacetate and sodium methoxide, respectively. A good yield of ethyl α-fluoroacrylate is obtained. The product is identified by infrared and vapor phase chromatographic analysis.

I claim:

1. In a process for preparing unsubstituted α-fluoroacrylic esters having the structure:

$$CH_2=CFCOOR$$

wherein R is a lower alkyl radical, the improvement which comprises: bringing into reactive combination in substantially equimolar amounts an ester of fluoroacetic acid having the structure:

$$CH_2FCOOR$$

wherein R is as above defined, and an aldehydic reactant selected from the group consisting of monomeric formaldehyde, paraformaldehyde and s-trioxane in the presence of a strong base selected from the class consisting of alkali metal hydrides, alkali metal hydroxides and alkali metal alkoxides at a temperature between about minus (−) 10° C. and plus (+) 25° C., and thereafter recovering the corresponding ester of α-fluoroacrylic acid.

2. A process according to claim 1, in which the aldehydic reactant is formaldehyde.

3. A process according to claim 1, in which the aldehydic reactant is s-trioxane.

4. A process according to claim 1, in which the aldehydic reactant is paraformaldehyde.

5. A process according to claim 1, in which the fluoroacetate reactant is ethyl fluoroacetate.

6. A process according to claim 1, in which the fluoroacetate reactant is methyl fluoroacetate.

7. A process according to claim 1, in which the reaction is carried out at 0° C. in the presence of a sodium alkoxide.

8. A process according to claim 7, in which the alkoxide is sodium methoxide.

9. A process according to claim 7, in which the alkoxide is sodium ethoxide.

References Cited in the file of this patent

UNITED STATES PATENTS

| | | |
|---|---|---|
| 2,734,074 | Redmon | Feb. 7, 1956 |
| 3,014,958 | Koch et al. | Dec. 21, 1961 |